United States Patent
Garg et al.

(10) Patent No.: US 12,072,198 B1
(45) Date of Patent: Aug. 27, 2024

(54) FLEET ROUTING SYSTEM AND METHOD

(71) Applicant: ZUM SERVICES, INC., Redwood City, CA (US)

(72) Inventors: Abhishek Garg, Redwood City, CA (US); Rohit Jain, Redwood City, CA (US); Sidi Liu, Redwood City, CA (US); Andrew Mormysh, Redwood City, CA (US); Gustavo Ocasio, Redwood City, CA (US); Niket Sanghvi, Redwood City, CA (US); Melissa Shiu, Redwood City, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/211,191

(22) Filed: Jun. 16, 2023

(51) Int. Cl.
*G01C 21/34* (2006.01)
*G01C 21/36* (2006.01)
*G08G 1/00* (2006.01)

(52) U.S. Cl.
CPC ..... *G01C 21/3484* (2013.01); *G01C 21/3407* (2013.01); *G01C 21/3667* (2013.01); *G08G 1/202* (2013.01)

(58) Field of Classification Search
CPC ............ G01C 21/3484; G01C 21/3407; G01C 21/3667; G08G 1/202
See application file for complete search history.

(56) References Cited

U.S. PATENT DOCUMENTS

| | | | | |
|---|---|---|---|---|
| 10,563,993 B1* | 2/2020 | Ho | ............... | G06Q 10/063 |
| 10,775,183 B2* | 9/2020 | Ho | ............... | G01C 21/3461 |
| 10,775,184 B2* | 9/2020 | Ho | ............... | G06Q 10/063 |
| 11,023,991 B2* | 6/2021 | Narayan | ............... | G06Q 50/40 |
| 11,143,520 B2* | 10/2021 | Ho | ............... | G06Q 50/40 |
| 11,287,270 B2* | 3/2022 | Xiang | ............... | G01C 21/3461 |
| 11,797,931 B1* | 10/2023 | Gross | ............... | G01C 21/3461 |
| 2017/0169366 A1* | 6/2017 | Klein | ............... | G06Q 10/025 |
| 2018/0211348 A1* | 7/2018 | Narayan | ............... | H04L 51/52 |
| 2018/0321050 A1* | 11/2018 | Chase | ............... | G08G 1/0175 |
| 2019/0120640 A1* | 4/2019 | Ho | ............... | G01C 21/3453 |
| 2019/0325376 A1* | 10/2019 | Khasis | ............... | G06Q 10/083 |
| 2020/0041296 A1* | 2/2020 | Ho | ............... | G01C 21/3461 |
| 2020/0080856 A1* | 3/2020 | Ho | ............... | G06Q 30/0284 |
| 2020/0103244 A1* | 4/2020 | Cella | ............... | G07C 5/008 |
| 2020/0182639 A1* | 6/2020 | Ho | ............... | G01C 21/3492 |
| 2020/0182640 A1* | 6/2020 | Ho | ............... | G06Q 50/40 |
| 2020/0208998 A1* | 7/2020 | Xiang | ............... | G01C 21/3492 |
| 2022/0012836 A1* | 1/2022 | Narayan | ............... | G06Q 10/109 |
| 2022/0390244 A1* | 12/2022 | Ho | ............... | G01C 21/3492 |
| 2023/0058169 A1* | 2/2023 | Cella | ............... | G06N 3/126 |

(Continued)

*Primary Examiner* — Luis A Martinez Borrero
(74) *Attorney, Agent, or Firm* — Kilpatrick Townsend & Stockton LLP

(57) ABSTRACT

A system and method that includes a ride requestor device, a driver device, a server device, and a user device is disclosed. The ride requestor device provides rider information and stop location information for a plurality of riders. The driver device provides location information, navigation information, and stop timing information for a particular vehicle in a fleet of vehicles. The server device includes an artificial intelligence engine which generates and optimizes a plurality of routes for service by the fleet of vehicles to provide a ride to each one of the plurality of riders.

18 Claims, 7 Drawing Sheets

(56) References Cited

U.S. PATENT DOCUMENTS

| | | | |
|---|---|---|---|
| 2023/0080281 A1* | 3/2023 | Kundu | G06N 5/022 |
| | | | 701/410 |
| 2023/0140268 A1* | 5/2023 | Hochberg | G06Q 10/06315 |
| | | | 701/533 |
| 2023/0419262 A1* | 12/2023 | Gross | G06Q 10/10 |

* cited by examiner

FIG. 6

FLEET ROUTING SYSTEM AND METHOD

TECHNICAL FIELD

The present application discloses systems and methods for routing a fleet of vehicles, scheduling stops, and optimizing those routes and stops based on one or more elements of primary concern.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis. Those costs may include pollution due to emissions, fuel costs, driver costs, costs in time, and others. Current solutions are not only inefficient but wasteful and contribute to cumulative emissions based environmental harm. Optimization is needed to reduce financial, pollution, and time costs in fleet vehicle use and routing.

It is, therefore, one object of this disclosure to provide a routing system which optimizes routes for fleet vehicles. It is another object of this disclosure to provide a routing system which optimizes routing and stop timing for fleet vehicles across an entire vehicle fleet. It is a further object of this disclosure to provide a method for optimizing routes and stop timing for fleet vehicles.

SUMMARY OF THE DISCLOSURE

A system and method that includes a ride requestor device, a driver device, a server device, and a user device is disclosed. The ride requestor device provides rider information and stop location information for a plurality of riders. The driver device provides location information, navigation information, and stop timing information for a particular vehicle in a fleet of vehicles. The server device includes an artificial intelligence engine which generates and optimizes a plurality of routes for service by the fleet of vehicles to provide a ride to each one of the plurality of riders. The artificial intelligence engine rider information provided by the ride requestor device and location information, navigation information, and stop timing information provided by the driver device to optimize the plurality of routes. Stop time information and stop location information about at least one of the optimized plurality of routes is transmitted to the user device from the server device. One of the plurality of routes is transmitted to the driver device by the server device. The plurality of routes includes turn by turn navigation information for the one of the plurality of optimized routes.

Also disclosed herein is a method. The method comprises identifying, by one or more processors in a server device, rider information and stop location information for a plurality of riders provided by a ride requestor device. The method further comprises identifying, by one or more processors in the server device, location information, navigation information, and stop timing information for a particular vehicle in a fleet of vehicles. The method further comprises generating, by one or more processors in the server device, a plurality of routes for service by the fleet of vehicles to provide a ride to each one of the plurality of riders based on rider information provided by the ride requestor device and the location information, the navigation information, and the stop timing information provided by the driver device. The method also includes optimizing, by the one or more processors in the server device, using an artificial intelligence engine included in the server device, a plurality of optimized routes for service by the fleet of vehicles to provide a ride to each one of the plurality of riders based on rider information provided by the ride requestor device and the location information, the navigation information, and the stop timing information provided by the driver device. The stop time information and stop location information may be about at least one of the plurality of optimized routes and is transmitted to a user device from the server device. One of the plurality of optimized routes is transmitted to the driver device by the server device where the plurality of optimized routes includes turn by turn navigation information for the one of the plurality of optimized routes.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 6 illustrates an exemplary embodiment of a route creation request in a fleet routing system.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
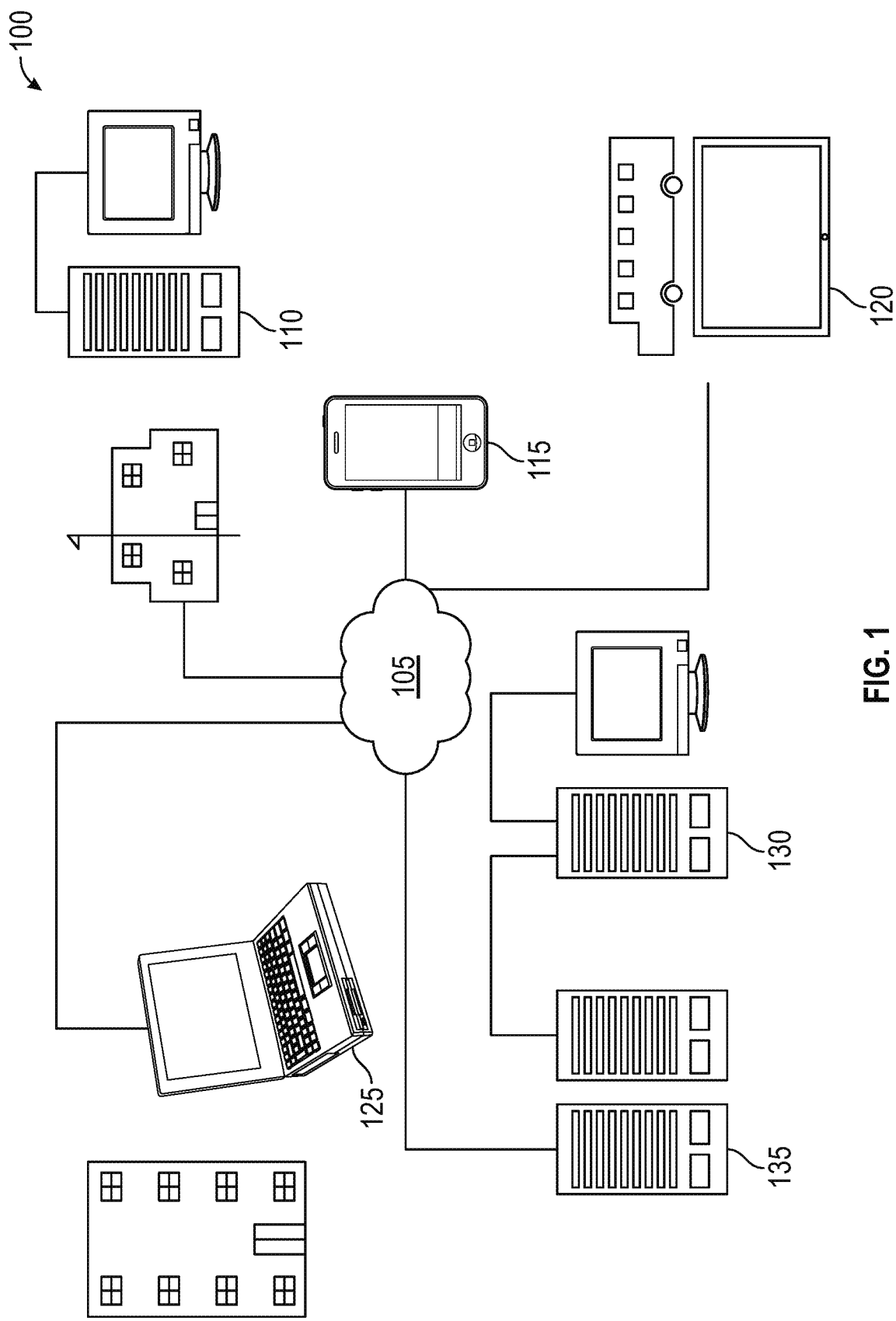
FIG. 1 illustrates box diagram of a fleet routing system.

FIG. 1 illustrates a box diagram of a fleet routing system 100. Fleet routing system may be implemented by use of a communications network 105 such as the Internet, which facilitates the exchange of information between various devices within fleet routing system 100. Fleet routing system may be used with any fleet but is described with respect to a fleet of school buses. The techniques disclosed herein may be used to deliver passengers or goods with little or no modification. Fleet routing system 100 may be implemented between a ride requestor device, such as a school device 110 (and/or an administration level device 125, which will be discussed below) and a user device 115, and a driver device 120 associated with a bus driver, for example. Fleet routing system 100 may be implemented by an administrator device 125. A provider may provide the administrator device 125 or the ride requestor device 110 with access to fleet routing system 100 by use of servers 135 and provider device 130. In one implementation, a school district may use administration level device 125 which provides buses to pick up and deliver children to a school and operate in a manner similar to ride requestor device 110. In other embodiments, ride requestor device 110 may be implemented to schedule routing for bus routes for a particular school. In other words, various levels of administration may access and implement fleet routing system 100 according to their particular needs for the delivery of passengers.

At the outset, a provider device 130 may give a ride requestor device 110 or an administrator level device 125 access to fleet routing system 100 by servers 135 to create bus routing for a particular school district or school as appropriate. Servers 135 may provide a user interface to ride requestor device 110 or an administrator level device 125 to create routes for each child in the district or school as appropriate. For example, a profile may be created for each child in the district or school as appropriate to be stored in non-volatile non-transitory storage media, which includes a home address for each child. In response, fleet routing system 100 may determine a distance between identified stops and a travel time between each of those identified stops to determine both a single bus route and a number of buses required for a necessary number of routes. For example, based on a standard bus configuration, a school bus may transport 80 seated students. However, due to time and distance constraints, a certain bus may only be able to pick up 45 students at identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In one embodiment, fleet routing system 100 may optimize routes based on the shortest time on the road for each bus, based on minimal fuel usage across the fleet, based on minimal emissions across the fleet, based on or any other basis that is meaningful to the school or community served by the school.

Once the routes are generated with children assigned to a particular bus, server 135 may transmit bus information to user device 115 by fleet routing system 100. Bus information may include bus stop information for picking up a child and a time for pick up at the bus stop. User device 115 may be associated with the child bus rider or with a parent of the child bus rider. User device 115 may be implemented as separate devices where one device is associated with the child rider and another device is associated with a parent, guardian, or other supervisor of a child. When the school bus is operating, a real time location may be provided to user device 115 so that the child and child supervisor may identify where the bus is currently located. A child or child supervisor may use user device 115 to create the child profile discussed above by providing information from user device 115 through communications network 105 to server 135.

Further, once the routes are generated, server 135 may transmit individual route information to a bus driver via driver device 120, in fleet routing system 100. Individual route information may be a mandatory bus route for the driver to follow with a stop sequence that is identified along the individual route. Individual route information may include turn by turn instructions with expected drive time duration and distance for the bus driver. Driver device 120 may also detect information from a particular bus drive and provide that information to server 135 through communication network 135. Information provided from driver device 120 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by server 135 to optimize routing. In one embodiment, driver device 120 may receive an optimized route from server 135 for picking up children based on a home or a school address and/or prior pickup/drop off history locations for children on a particular route. In another embodiment, driver device 120 may further be optimized to prevent U-turns, enforce curbside pickup to avoid children crossing streets. Server 135 may receive information from driver device 120 which it may use to optimize routes based on learning from past driver routes to determine a best path between stops. Server 135 may receive information from driver device 120 which may optimize based on learned roadblocks and driver input to driver device 120 with new information (e.g., a street closure or construction) which causes server 135 to reoptimize the bus route. Server 135 may use information to determine and store driving instructions at the ride route level for a particular bus and driver device 120. Server 135 may track a bus via driver device 135 during a pickup or drop off ride and ensure compliance with the optimized route. If driver device 120 indicates that a bus is not following optimized route information, server 135 may send a message to ride requestor device 110, administrator device 125, or provider device 130 to allow either the ride requestor, the administrator, or the provider to contact the bus driver with route correction instructions.

Based on information received from driver device 120, server device 135 may maintain estimated global positioning system ("GPS") waypoints and an estimated time of arrival ("ETA") information for each ride, which may be constantly updated based on information provided by driver device 120. Driver device 120 may further provide real-time routing, navigation, and path information based on a current location of driver device 120. Routing, navigation, and path information may be displayed on a screen associated with driver device 120. The user may receive, via user device 115, expected vehicle path information on a map displayed on a screen of user device 115. Thus, a user of user device 115 may be able to track bus 120 in real-time and observe where a bus is currently and when a bus will be at a specific stop, which may be identified by waypoints provided to the user from server 135 via user device 115. Any data received from driver device 120 may be stored as historical data which may be used to further optimize bus routing on a permanent or temporary basis depending on road conditions, pickup/drop off requirements, and any other factor identified herein.

Ride requestor device 110, user device 115, driver device 120, administrator device 125, and provider device 130 may be implemented as any electronic device with processing power sufficient to share electronic information back and forth through communications network 105. Examples of ride requestor device 110, user device 115, driver device 120, administrator device 125, and provider device 130 include mobile phones, desktop computers, laptop computers, tablets, game consoles, personal computers, mobile devices, notebook computers, smart watches, and any other digital device that has the processing ability to interact with the server 135.

Ride requestor device 110, user device 115, driver device 120, administrator device 125, and provider device 130 may include software and hardware modules that execute computer operations, communicate with communication networks 105 and server 135. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within ride requestor device 110, user device 115, driver device 120, administrator device 125, and provider device 130, are used to connect with server 135.

Server 135 may provide web-based access to fleet routing system 100 (or relevant portions based on which device is associated with a particular function—e.g., a parent using user device 115 may not have permissions to reroute buses) to ride requestor device 110, user device 115, driver device 120, administrator device 125, and provider device 130.

Communication network 105 may be a wired, wireless, or both and facilitate communications in fleet routing system 100. Server 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing and communication for web based fleet routing system 100. Server computer 135 may be implemented as one or more actual devices but are collectively referred to as server computer 135 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within one or more server 135 may be used to execute the various methods or algorithms disclosed herein, and interface with ride requestor device 110, user device 115, driver device 120, administrator device 125, and provider device 130.

In one embodiment, ride requestor device 110, user device 115, driver device 120, administrator device 125, and provider device 130 may access server 135 by a communication network 105. In each case, wireless communication network 135 connects ride requestor device 110, user device 115, driver device 120, administrator device 125, and provider device 130 via an internet connection provided by communication network 105. Any suitable internet connection may be implemented for wireless communication network 105 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, ride requestor device 110, user device 115, driver device 120, administrator device 125, and provider device 130 and server 135.

Figure 2:
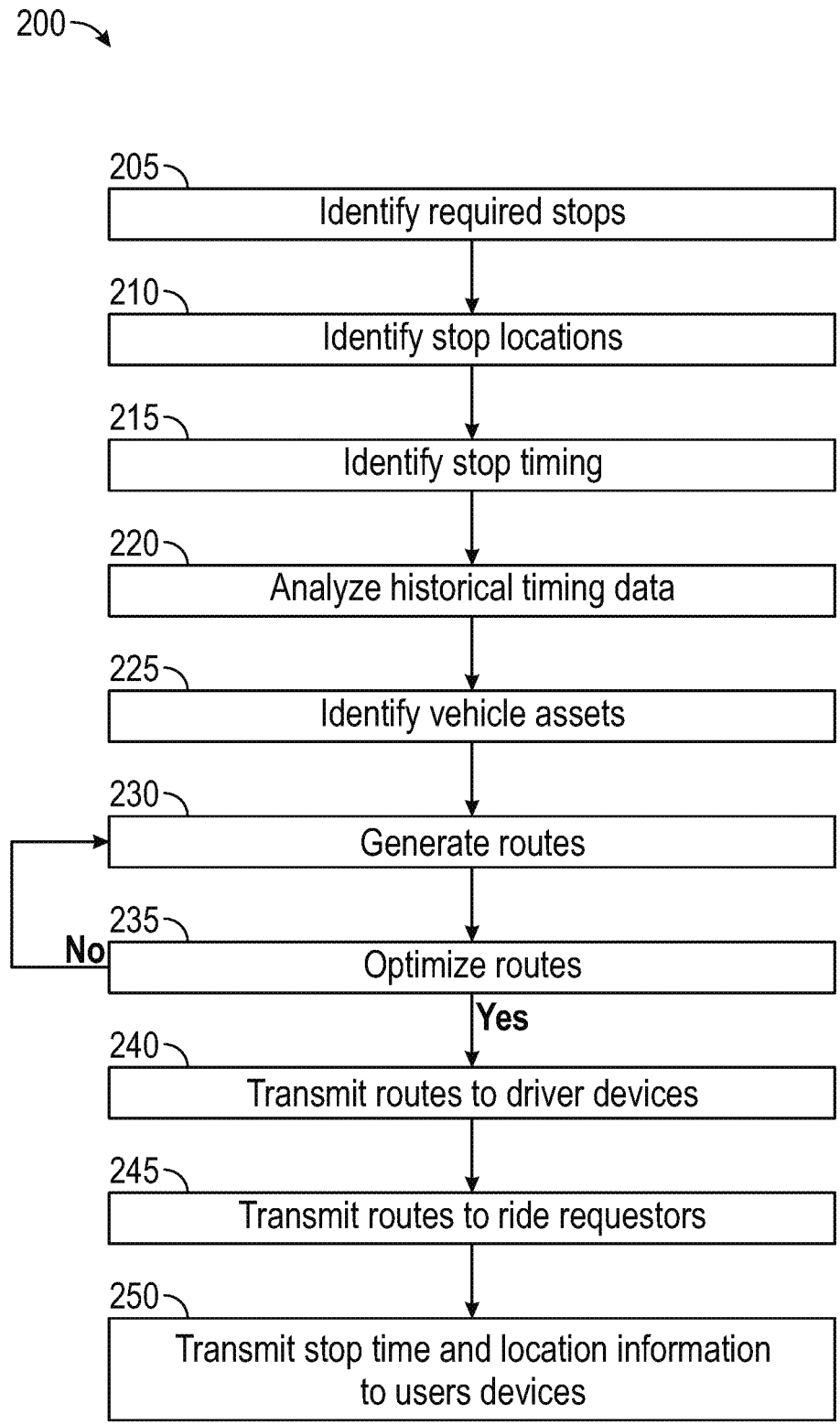
FIG. 2 illustrates a method for optimizing fleet routes in a fleet routing system.

FIG. 2 illustrates a method 200 for optimizing fleet routes in a fleet routing system, such as fleet routing system 100, shown in FIG. 1. Method 200 may be executed by, for example, one or more processors associated with server computer 135, as shown in FIG. 1. Method 200 begins by identifying all of the required stops to be served by a fleet of vehicles at step 205. Method 200 continues by identifying stop locations for those required stops at step 210 and stop timing for those required stops at step 215. At step 220, server computer 135 may analyze historical data, including timing data, and other data obtained from driver device 120 (or each driver device for each driver within the fleet). At step 225, server computer 135 may identify vehicle assets available to provide transportation services. For example, server computer 135 may determine how many buses are available to transport children to school on a particular morning, accounting for broken down buses or buses that may be taken out of service for maintenance.

At step 230, server computer 135 may generate routes for each vehicle in a fleet of vehicles based on the required stops, the stop locations, the stop timing, the historical timing data, and the number of available vehicles. Server computer 135 may then optimize routes at step 235. Optimizing routes for fleet vehicles, at step 235 may be done manually or using a trained artificial intelligence engine with machine learning techniques. For example, as historical data is accumulated from driver device 120 (or each driver device associated with each driver in the fleet of vehicles), a processor may learn, using machine learning techniques, how to make a particular route more efficient in terms of time on the road, fuel consumption, minimal emissions, driver time, or any other specified basis that is meaningful to the school/district or community served by the school/district. If the optimal route generated at step 235 is determined to not be optimized based on a particular reason (step 235—No), method 200 may return to step 230 to regenerate routes based on another optimization scheme. Once an optimal fleet routing scheme has been generated at step 235—Yes, server 135 may transmit individual routes in the fleet of routes to individual driver devices 120 at step 240. Server 135 may further transmit route information to ride requestors, such as a district or school level device 110/125, or both, at step 245. Server 135 may further transmit stop time and location information to each user device 115 enrolled in fleet routing system 100 at step 250. In this manner, both the district/school level device 110/125 and individual users, such as parents, will know where a particular bus should be and when, while also knowing that the vehicle is traveling by the most efficient and optimized route on any particular day.

Figure 3:
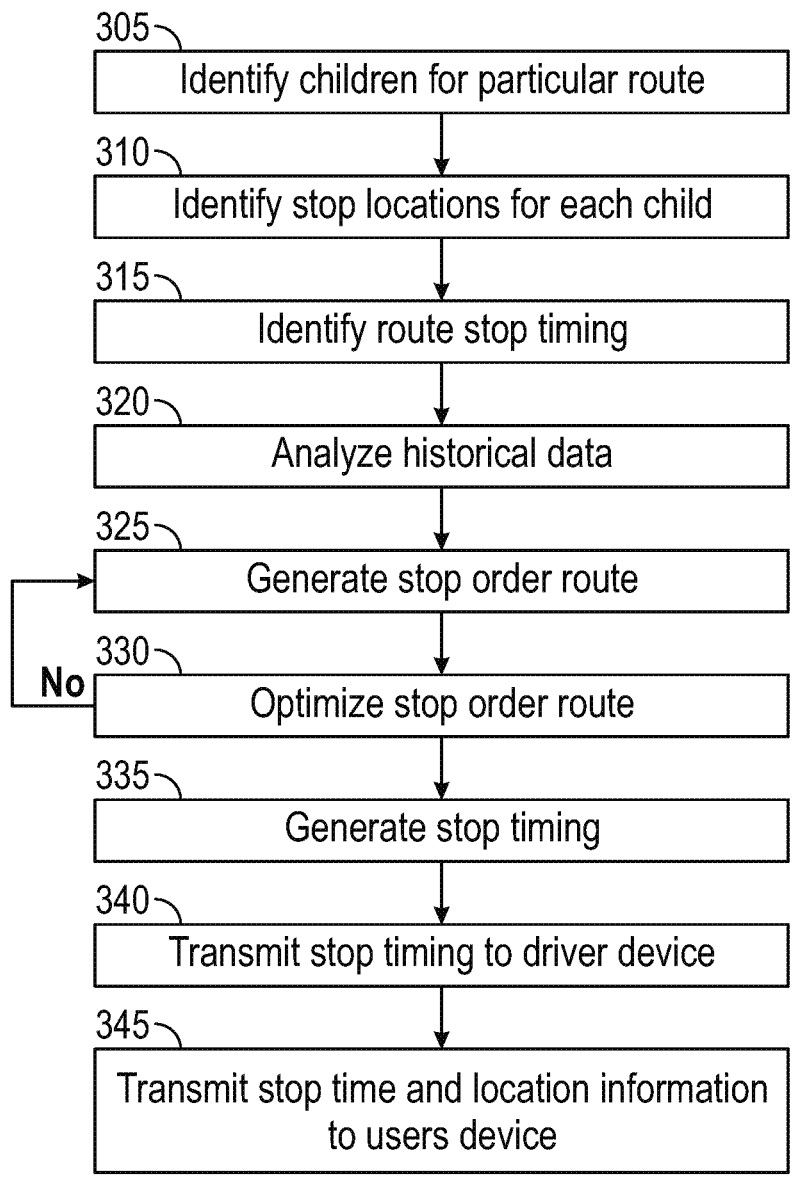
FIG. 3 illustrates a method for optimizing individual vehicle routes in a fleet routing system.

FIG. 3 illustrates a method 300 for optimizing individual vehicle routes in a fleet routing system, such as fleet routing system 100, shown in FIG. 1. Method 300 may be used in conjunction with method 200, shown in FIG. 2, to optimize both fleet routes but also to optimize individual routes for each vehicle of the fleet, based on, for example, a stop order. In other words, method 300 may be incorporated into method 200 and vice versa. Method 300 begins with server 135 identifying children assigned to a particular route at step 305. At step 310, server 135 may identify stop locations for each child and identify route stop timing at step 315. Stop timing may depend on how many children need to board a bus at a particular stop or time between individual stops, which may be known to an artificial intelligence engine within server 135 based on historical data analyzed at step 320. Historical data may be collected from driver device 120 for a particular route.

At step 325, server 135 may generate a stop order for a particular route and optimize that route at step 330 using artificial intelligence according to the techniques described herein. If the stop order is not optimal (Step 330—No), based for example, on picking up a special needs child in a wheelchair or any other reason, server 135 may regenerate a stop order based on a user change or new information provided by a user. If the optimized order is acceptable at step 330 (Step 330—Yes), server 135 may generate stop timing at step 335 and transmit the stop timing to driver device 120 at step 340. Server 135 may further transmit stop time and stop location information to user device 115 at step 345.

Figure 4:
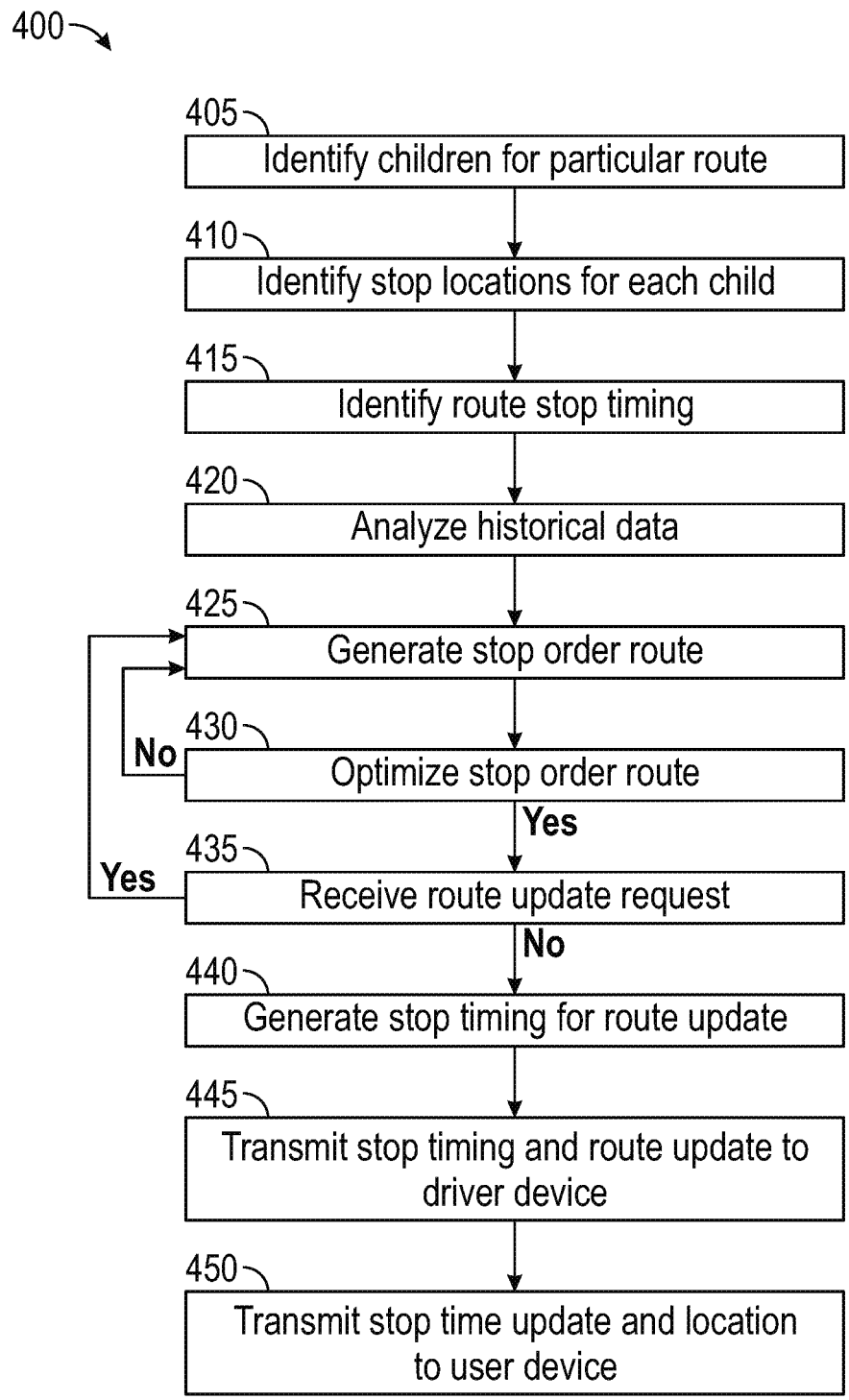
FIG. 4 illustrates a method for optimizing an individual vehicle route in response to a route update request.

FIG. 4 illustrates a method 400 for optimizing an individual vehicle route in response to a route update request in a fleet routing system 100, shown in FIG. 1. Method 400 may be used in conjunction with method 200, shown in FIG. 2, and method 300 shown in FIG. 3, to optimize both fleet routes but also to optimize individual routes for each vehicle of the fleet, based on, for example, a route update request. In other words, method 400 may be incorporated into methods 200/300 and vice versa. Method 400 begins with server 135 identifying children assigned to a particular route at step 405. At step 410, server 135 may identify stop locations for each child and identify route stop timing at step 415. Stop timing may depend on how many children need to board a bus at a particular stop or time between individual stops, which may be known to an artificial intelligence engine within server 135 based on historical data analyzed at step 420. Historical data may be collected from driver device 120 for a particular route.

At step 425, server 135 may generate a stop order for a particular route and optimize that route at step 430 using artificial intelligence according to the techniques described herein. If the stop order is not optimal (Step 430—No), based for example, on picking up a special needs child in a wheelchair or any other reason, server 135 may regenerate a stop order based on a user change or new information provided by a user. If the optimized order is acceptable at step 430 (Step 430—Yes), server 135 further updates the route by receiving a route update request at step 435.

A route update request may be made by, for example, a user of user device 115 to indicate to server 135 that a particular child will be staying home from school or may be late to school or any other reason why a child may not be at a certain stop (Step 435—Yes). In response, server 135 may regenerate a stop order route at step 425 and re-optimize the stop order at step 430 to account for the child that will not be riding on that particular bus route on a particular day. If the stop order is optimal (Step 430—Yes) and no further update requests have been received, server 135 may generate stop timing for the re-optimized route at step 440. If other route update requests are received at step 435—Yes, the process may recursively re-optimize stop order until all ride update requests have been addressed. At step 445, server 135 may transmit stop timing and route update information to the driver device, including routing, navigation, and path information for the re-optimized stop order and route. Server 135 may further transmit stop time update and location information to user device 115 at step 450.

Figure 5:
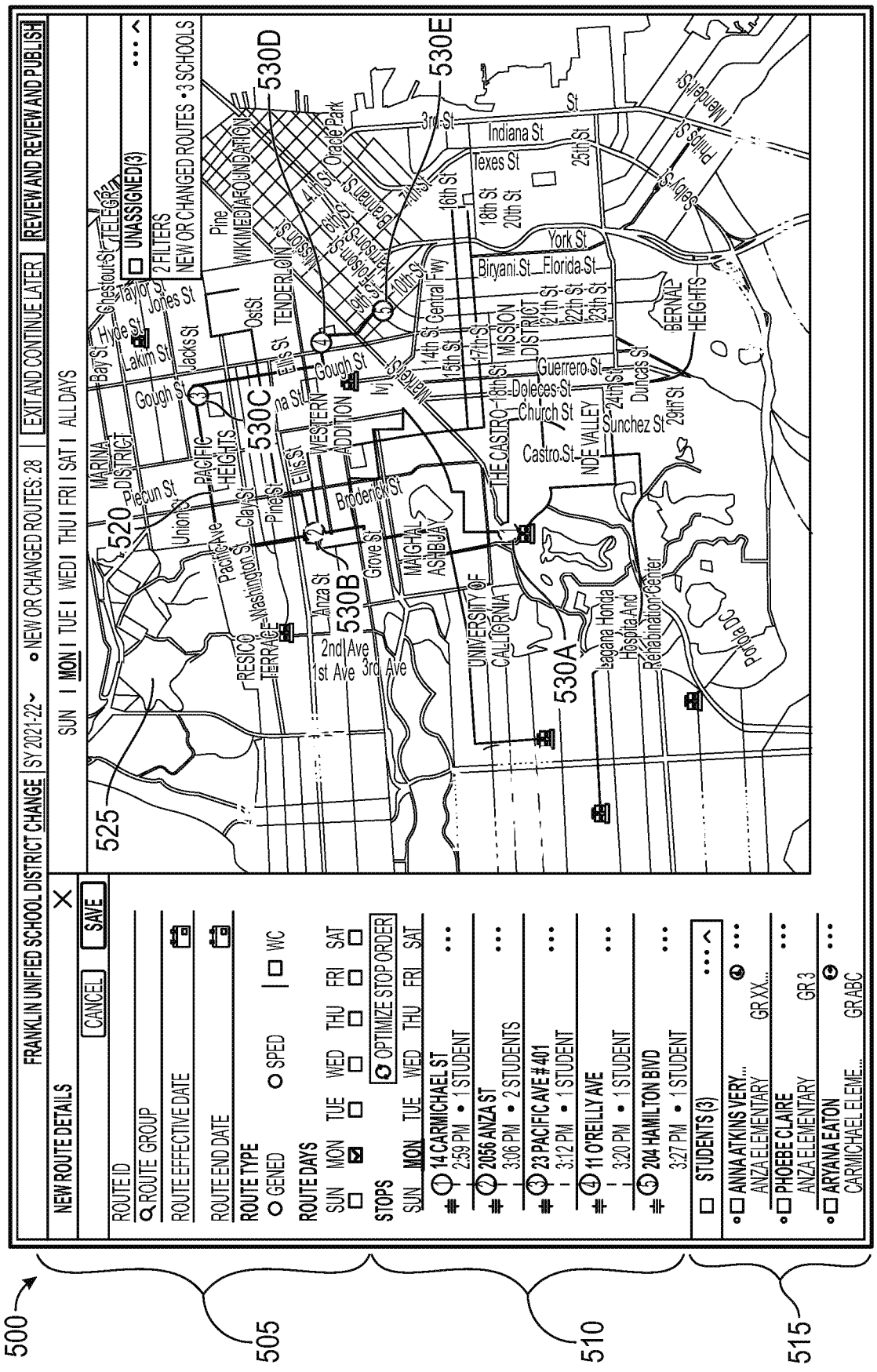
FIG. 5 illustrates an exemplary embodiment of a fleet routing system.

FIG. 5 illustrates an exemplary embodiment 500 of fleet routing system 100, shown in FIG. 1. Embodiment 500 provides a view of a graphical user interface which a requestor device 110, administrator device 125, and/or a provider device 130 may access via server 135 to provide information to fleet routing system 100. For example, the graphical user interface of embodiment 500 may include a route detail interface 505, a stop location interface 510, a students interface 515, a route 520 displayed on a map 525, with various stop locations 530A-530E displayed on map 525.

Route detail interface 505 may provide a requestor device 110, administrator device 125, and/or a provider device 130 an interface from which to create a new route. The route may be assigned an identifier, a route group, a beginning date for a new route, a route end date, a specification for a type of route (general education, special education, or wheelchair, for example) and the days of the week the route is to be driven by a fleet vehicle.

Stop location interface 510 may identify a plurality of stops 530A-530E for a particular route. As shown, stop location interface 510 identifies 5 stops, which is illustrated purely for explanatory reasons. Any number of stops may be implemented for a particular route. As shown in FIG. 5, an address for the stop, a time for the stop, and the number of students associated with that stop are provided through stop location interface 510. The stops may be color coded to show that a stop has occurred or not yet occurred if a ride is currently active. Similarly, a color coding may be used to identify stops for picking up children and stops for schools. For example, as shown in FIG. 5, Stops 530C-530D are pickup locations while stops 530A and 530B are identified as Anza Elementary School and Carmichael Elementary School, respectively. In this case, a single bus is picking up students for delivery to two different schools.

Stop location interface 510 may further provide an "optimize" user interface button which allows a requestor device 110, administrator device 125, and/or a provider device 130 to request that a stop order be optimized once the requisite information has been provided through route detail interface 505 and students interface 515, as discussed in FIGS. 3-4 above. The fleet routes may also be optimized once information has been provided as outlined in FIG. 2. It should be noted that implementing fleet routing system 100 will likely be based on manually devised routes from which a school or school district has been operating. Once the manual information is provided to fleet routing system 100, server 135 may optimize the route information and provide an optimized fleet route scheme based on artificial intelligence and the identified optimization basis (e.g., time on the road, fuel costs, emissions, etc.). Those routes may then be optimized based on stop order, as previously described.

A students interface 515 may also be provided which identifies individual students which may be assigned to a particular route. The students interface 515 may provide access to a rider profile, identify the user's grade level (e.g., 3rd grade), and may also identify the school attended by the child. Students interface may be used to provide an update request for a particular route.

Map 525 may be shown to give route detail interface 505 may provide a requestor device 110, administrator device 125, and/or a provider device 130 a visual explanation of routes that are being created to provide information to fleet routing system 100. Route 520 is shown, purely for explanatory purposes, to illustrate an exemplary route prior to optimization. Route 520 is shown as having five stops, beginning at stop 530A, which is Carmichael Elementary and proceeding to stop 530F through stops 530B, 530C, and 530D according to a defined navigation and routing scheme. While a provider, a district administrator, or a school official may request optimization of a current route, a request may also be made to optimize routes across an entire entity level, such as an entire school district as well.

Figure 6:
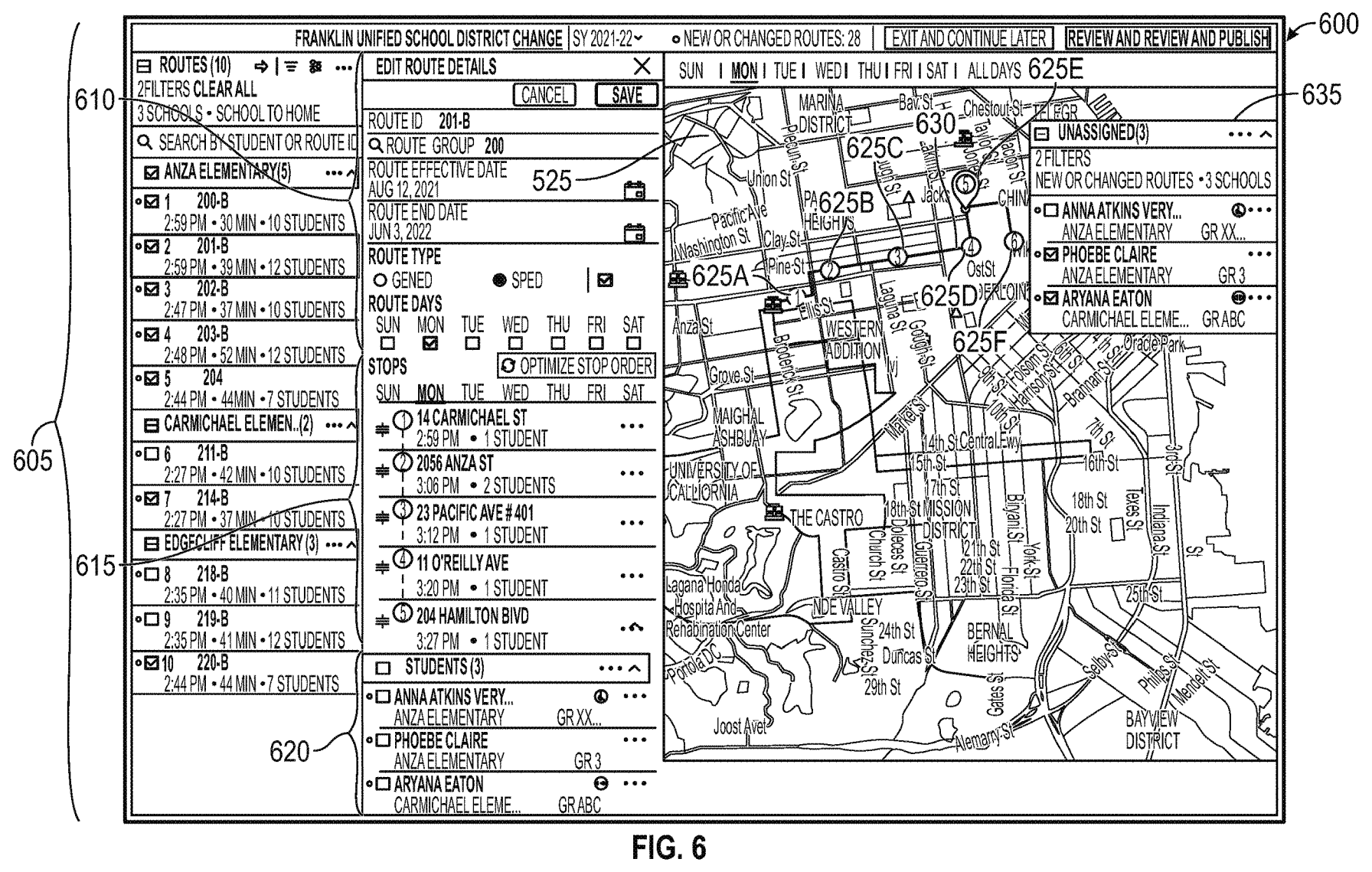

FIG. 6 illustrates an exemplary embodiment 600 of fleet routing system 100, shown in FIG. 1. Embodiment 600 provides a view of a graphical user interface which a requestor device 110, administrator device 125, and/or a provider device 130 may access via server 135 to provide information to fleet routing system 100. For example, the graphical user interface of embodiment 600 may include a route list 605, a route information interface 610, a stop location information interface 615, a students information interface 620, an optimized route 630 displayed on a map 525, with various stop locations 625A-625F displayed on map 525.

Route information interface 605 may provide a requestor device 110, administrator device 125, and/or a provider device 130 a display of a series of defined routes once the routes have been optimized. As shown in route information interface 605, a plurality of routes is designated for each one of three different elementary schools. Each route is identified by a number or number and letter to designate the different routes within fleet routing system 100 for Franklin Unified School district, for example.

Route information interface 610 is similar to route detail interface 510 although information input into route detail interface 510 is displayed on route information interface 610. As shown in FIG. 6, route information interface 610 highlights route 201B, which is a special education route with a wheelchair intended operate every Monday beginning on Aug. 12, 2021, and end on Jun. 3, 2022. These dates are shown as historical dates merely for explanation based on a previously existing route being optimized as a demonstration of the relative improvements in fleet efficiency compared to an optimized routing scheme created by fleet routing system 100. Route 201B is shown as route 630 on map 525 in FIG. 6.

Stop location interface 615 may function similarly to stop location interface 615 and provide an "optimize" user interface button which allows a stop order to be further optimized after changes to a particular route. As shown, the optimized route 201B has indicated that three students, Anna Atkins, Phoebe Claire, and Aryana Eaton should not be included in route 201B and should be reassigned to a different route as a result of the optimization of route 630.

Route 630 begins at stop 625A at Anza Elementary school and proceeds through stops 625B, 625C, 625D, and 625E before dropping off the last student at stop 625F. Route 630 has been optimized to include only students who are attending the same school and has shortened the overall distance and travel time for a bus on route 201B, while transporting more children to more stops than the manually created route.

Figure 7:
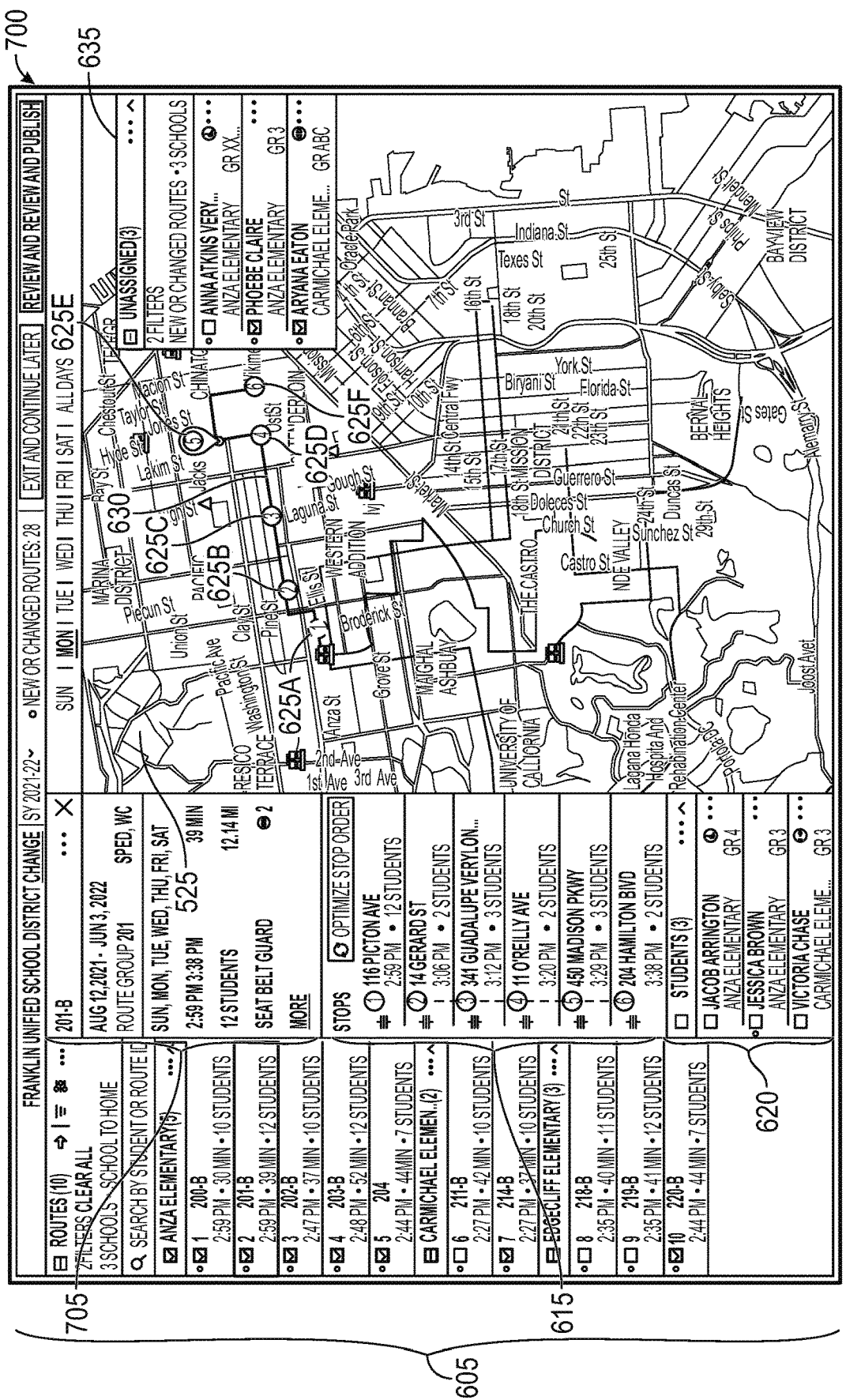
FIG. 7 illustrates an exemplary embodiment of a route update request in a fleet routing system.

FIG. 7 illustrates an exemplary embodiment 700 of a route update request in a fleet routing system 100. Embodiment 700 provides a view of a graphical user interface which a user device 115 has made a route update request server 135 to provide information to fleet routing system 100. Embodiment 700 may be a graphical user interface provided to a requestor device 110, administrator device 125, and/or a provider device 130 which allows optimization of bus routes based on the route update request. For example, the graphical user interface of embodiment 700 may include a route list 605, a route information details interface 705, a stop location information interface 615, a students information interface 620, an optimized route 630 displayed on a map 525, with various stop locations 625A-625F displayed on map 525.

Route information interface 605 may provide a requestor device 110, administrator device 125, and/or a provider device 130 a display of a series of defined routes once the routes have been optimized. As shown in route information interface 605, a plurality of routes is designated for each one of three different elementary schools. Each route is identified by a number or number and letter to designate the different routes within fleet routing system 100 for Franklin Unified School district, for example.

Route detail information interface 705 illustrates information input into route detail interface 610, shown in FIG. 6, and is displayed as regular route information in route detail information interface 705. As shown in FIG. 7, route detail information interface 705 highlights route 201B, which is a special education route with a wheelchair intended operate every day beginning on Aug. 12, 2021, and end on Jun. 3, 2022, as a final optimized route. These dates are shown as historical dates merely for explanation based on a previously existing route being optimized as a demonstration of the relative improvements in fleet efficiency compared to an optimized routing scheme created by fleet routing system 100. Route 201B is shown as route 630 on map 525 in FIG. 6.

Stop location interface 615 may function similarly to stop location interface 615 and provide an "optimize" user interface button which allows a stop order to be further optimized based on a route update request. As shown in stop location interface 615, a new stop on 450 Madison Parkway has been generated based on optimization and due to a new student moving into the school who made a route update request to fleet routing system 100. The new drop off location is illustrated as stop 625E maybe and is more convenient for dropping off three students at stop 625E. Those students are identified as Jacob Arrington, Jessica Brown, and Victoria Chase in students information interface 620.

A new optimized route is generated as route 630 with the new stop on 450 Madison Parkway. Route 630 begins at stop 625A at Anza Elementary school and proceeds through stops 625B, 625C, 625D, and 625E before dropping off the last student at stop 625F. Route 630 has been optimized to include providing a drop off point for a new student and other students based on optimization to create a more optimal route for dropping off students under new conditions, such as a new student requesting bus service.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:
   a first device associated with a ride requestor, the first device providing rider information and stop location information for at least one of a plurality of riders;
   a second device associated with a driver of a particular vehicle in a fleet of vehicles, the second device providing location information, navigation information, and stop timing information for the particular vehicle in a fleet of vehicles, and
   a server computer, the server computer including an artificial intelligence engine which generates and optimizes a plurality of scheduled and repeating routes for service by the fleet of vehicles to provide the particular vehicle and a driver for the particular vehicle to provide a ride to each one of the plurality of riders based on the rider information provided by the first device, wherein the location information, the navigation information, and the stop timing information generated by the server computer is provided to the second device associated with the driver along with information identifying which ones of the plurality of riders the fleet of vehicles is assigned to pickup or drop off on a particular day, wherein the artificial intelligence engine uses machine learning, historical data, including historical timing data, obtained from the second device, and a number of available vehicles in the fleet of vehicles to generate and optimize the plurality of routes for service by the fleet of vehicles;

wherein stop time information and stop location information about at least one of the optimized plurality of routes is transmitted to the first device from the server computer, and wherein one of the plurality of routes is transmitted to the second device by the server computer, the plurality of routes including turn by turn navigation information for the one of the optimized plurality of routes.

2. The system of claim 1, wherein the artificial intelligence engine generates and optimizes each one of the plurality of routes based on having the vehicles in the fleet of vehicles operating for the least amount of time.

3. The system of claim 1, wherein the artificial intelligence engine generates and optimizes each one of the plurality of routes based on using minimal fuel to complete each one of the optimized plurality of routes.

4. The system of claim 1, wherein the artificial intelligence engine generates and optimizes each one of the plurality of routes based on emitting minimal emissions to complete each one of the optimized plurality of routes.

5. The system of claim 1, wherein the first device, the second device, and a user device communicate through a communications network with the server computer.

6. The system of claim 1, wherein the server computer re-optimizes one or more routes in the optimized plurality of routes based on a ride update request submitted to the server computer by the first device.

7. The system of claim 1, wherein the server computer provides a graphical user interface showing each of the plurality of routes on a map and provides the graphical user interface to the first device, the second device, and a provider device.

8. The system of claim 7, wherein the map further includes displaying a plurality of stops associated with a one route among the optimized plurality of routes on the graphical user interface.

9. The system of claim 8, wherein the map further includes displaying a location of a second device in real time.

10. A method, comprising:

identifying, by one or more processors in a server device, rider information and stop location information for a plurality of riders provided by a ride requestor device associated with a ride requestor;

identifying, by one or more processors in the server device, location information, navigation information, and stop timing information for a particular vehicle in a fleet of vehicles;

generating, by one or more processors in the server device, a plurality of scheduled and repeating routes for service by the fleet of vehicles to provide a ride to each one of the plurality of riders based on rider information provided by the ride requestor device and the location information, the navigation information, and the stop timing information provided by a driver device associated with a driver of the particular vehicle in the fleet of vehicles; and optimizing, by the one or more processors in the server device, using an artificial intelligence engine included in the server device, a plurality of optimized scheduled and repeating routes for service by the fleet of vehicles to provide the particular vehicle and a driver for the particular vehicle to provide a ride to each one of the plurality of riders based on rider information provided by the ride requestor device, wherein the location information, the navigation information, and the stop timing information generated by the one or more processors in the server device is provided to the driver device along with information identifying which ones of the plurality of riders the fleet of vehicles is assigned to pickup or drop off on a particular day, wherein the artificial intelligence engine uses machine learning, historical data, including historical timing data, obtained from the driver device, and a number of available vehicles in the fleet of available vehicles to generate and optimize the plurality of routes for service by the fleet of vehicles;

wherein stop time information and stop location information about at least one of the plurality of optimized routes is transmitted to the ride requestor device from the server device, and wherein one of the plurality of optimized routes is transmitted to the driver device by the server device, the plurality of optimized routes including turn by turn navigation information for the one of the plurality of optimized routes.

11. The method of claim 10, wherein the artificial intelligence engine generates and optimizes each one of the plurality of optimized routes based on having the vehicles in the fleet of vehicles operating for the least amount of time.

12. The method of claim 10, wherein the artificial intelligence engine generates and optimizes each one of the plurality of optimized routes based on using minimal fuel to complete each one of the plurality of optimized routes.

13. The method of claim 10, wherein the artificial intelligence engine generates and optimizes each one of the plurality of optimized routes based on emitting minimal emissions to complete each one of the plurality of optimized routes.

14. The method of claim 10, wherein the ride requestor device, the driver device, and a user device communicate through a communications network with the server device.

15. The method of claim 10, wherein the server device re-optimizes one or more routes in the plurality of optimized routes based on a ride update request submitted to the server device by the ride requestor device.

16. The method of claim 10, wherein the server device provides a graphical user interface showing each of the plurality of routes on a map and provides the graphical user interface showing each one of the plurality of optimized routes on a map and provides the graphical user interface to the ride requestor device, the driver device, and a provider device.

17. The method of claim 16, wherein the map further includes displaying a plurality of stops associated with one route among the plurality of optimized routes on the graphical user interface.

18. The method of claim 17, wherein the map further includes displaying a location of a driver device in real time.

* * * * *